(12) United States Patent
Kim

(10) Patent No.: US 10,698,211 B2
(45) Date of Patent: Jun. 30, 2020

(54) HEAD-UP DISPLAY DEVICE FOR VEHICLE

(71) Applicant: HYUNDAI MOBIS CO., LTD., Seoul (KR)

(72) Inventor: Byung Ki Kim, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 0 days.

(21) Appl. No.: 15/945,609

(22) Filed: Apr. 4, 2018

(65) Prior Publication Data

US 2018/0373036 A1    Dec. 27, 2018

(30) Foreign Application Priority Data

Jun. 27, 2017    (KR) .................. 10-2017-0080932

(51) Int. Cl.
*G02B 27/01* (2006.01)
*B60R 1/00* (2006.01)
*B60K 37/00* (2006.01)

(52) U.S. Cl.
CPC ............ *G02B 27/0149* (2013.01); *B60R 1/00* (2013.01); *B60K 37/00* (2013.01); *B60R 2300/205* (2013.01); *G02B 2027/0154* (2013.01)

(58) Field of Classification Search
CPC ........ G02B 27/0149; G02B 2027/0154; B60R 1/00; B60R 2300/205; B60K 37/00
USPC ........................................................ 359/630
See application file for complete search history.

(56) References Cited

U.S. PATENT DOCUMENTS

2014/0368097 A1* 12/2014 Yomogita .......... G02B 27/0149
                                                                    312/23

* cited by examiner

*Primary Examiner* — Jerry L Brooks
(74) *Attorney, Agent, or Firm* — Knobbe Martens Olson & Bear LLP

(57) ABSTRACT

A head-up display device for a vehicle includes a housing section mounted to a vehicle; a moving section reciprocating on the housing section; a holder section coupled to a combiner and rotatably coupled to the moving section; and a rotating section rotating by receiving power from a driving section, connected with the moving section, and transferring power to the moving section.

10 Claims, 17 Drawing Sheets

FIG. 5
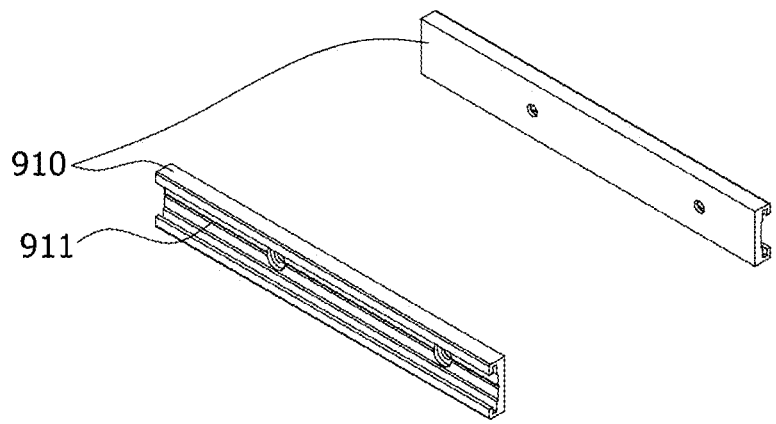
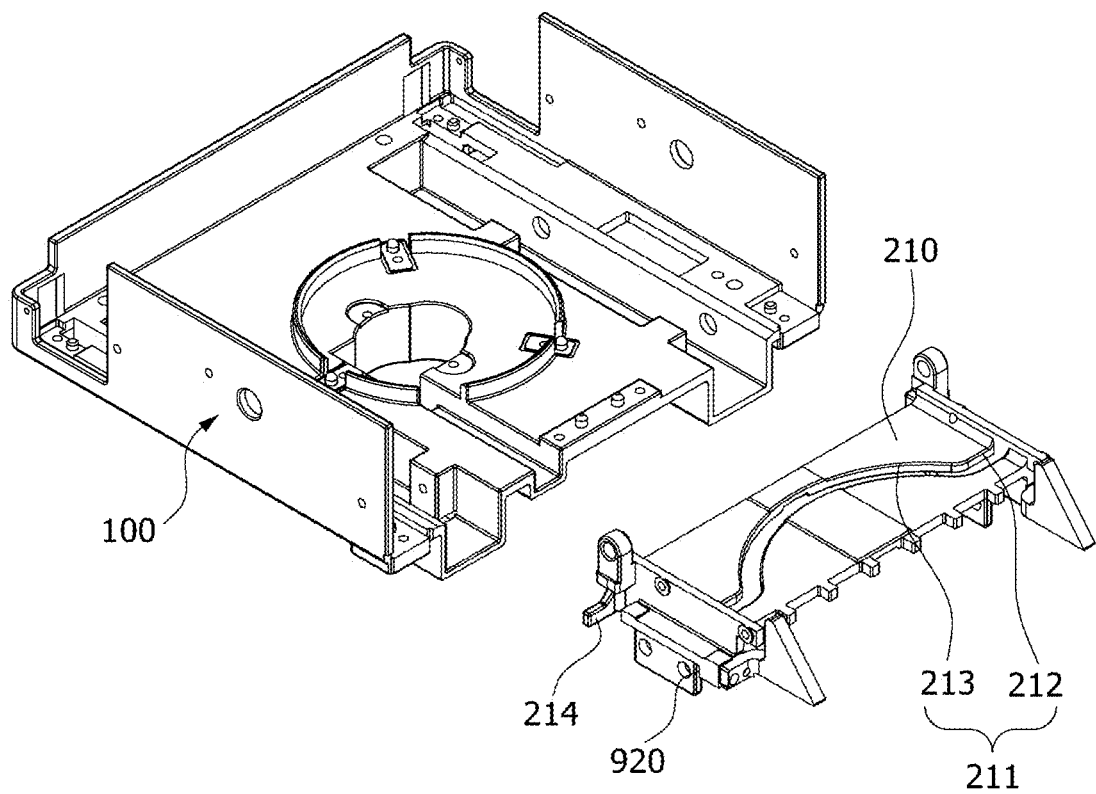

FIG. 14
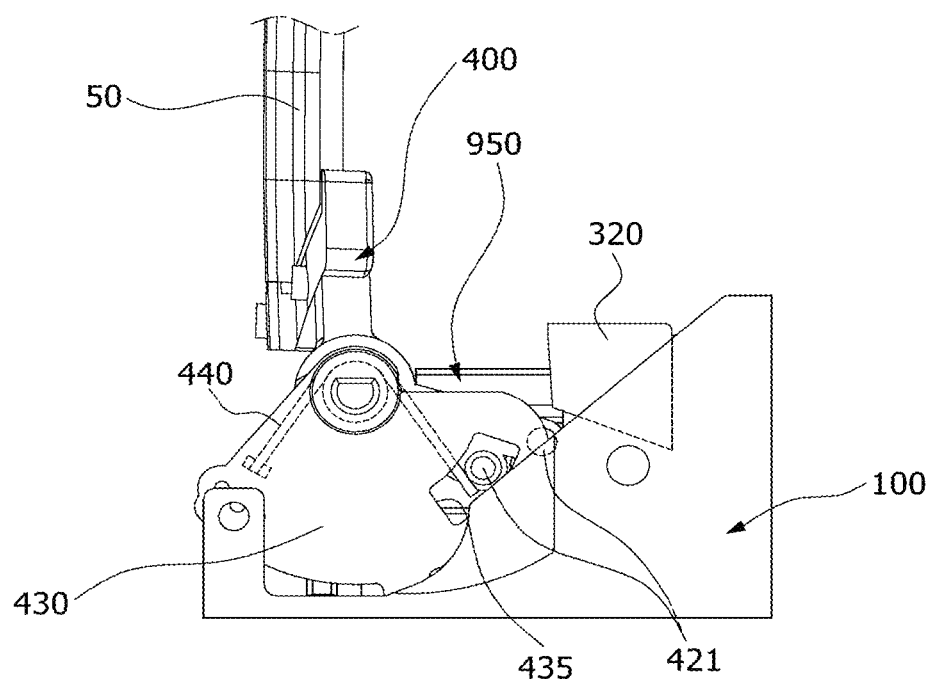
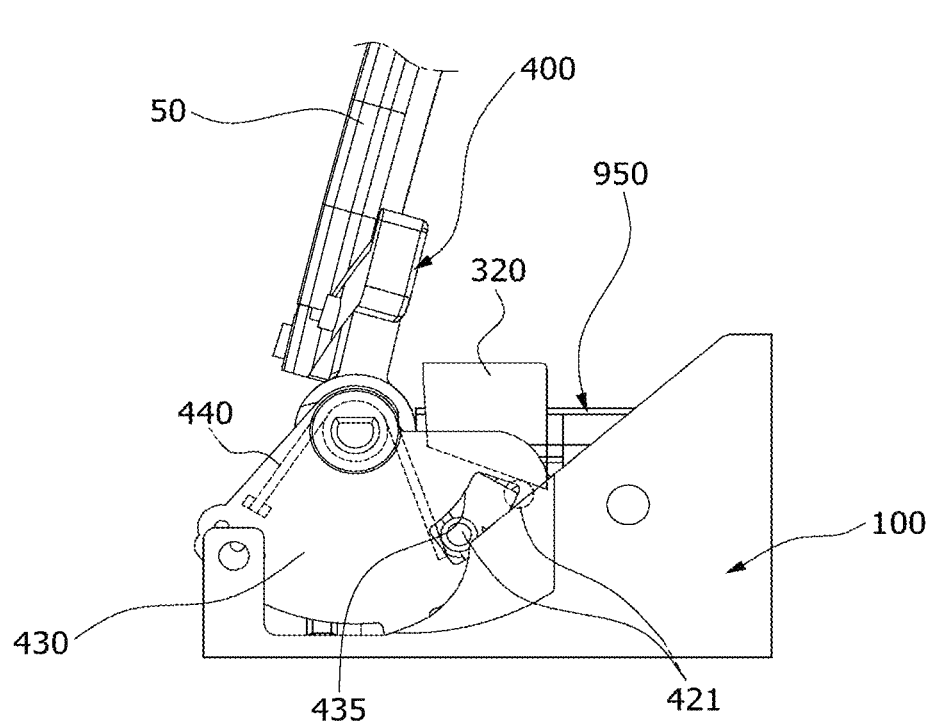

HEAD-UP DISPLAY DEVICE FOR VEHICLE

CROSS-REFERENCE TO RELATED APPLICATION

The present application claims priority under 35 U.S.C. § 119(a) to Korean Patent Application No. 10-2017-0080932 filed on Jun. 27, 2017 in the Korean Intellectual Property Office, which is incorporated herein by reference in its entirety.

BACKGROUND

1. Technical Field

Embodiments of the present disclosure relate to a head-up display device for a vehicle, and more particularly, to a head-up display device for a vehicle, capable of improving combiner opening/closing performance.

2. Related Art

In general, a head-up display (HUD) is a system for displaying a variety of vehicle information as a virtual image on a windshield glass of a vehicle to allow a driver to check the vehicle information while keeping looking forward during driving.

A combiner type head-up display generally has a structure in which a combiner is received inside a vehicle and is unfolded when necessary. There are a horizontal type combiner head-up display and a vertical type combiner head-up display depending on the disposition of an optical mechanism according to the head-up display mounting space of the vehicle.

In particular, in the case of a conventional horizontal type combiner head-up display, a combiner is unfolded by being moved in a horizontal direction through using a lead screw. In this case, the opening/closing speed of the combiner is determined by the lead size of the lead screw and a motor speed, and problems may be encountered in that the unfolding speed of the combiner is not fast and the adjustment of the angle of the combiner relies on the lead size and the angle of a step motor.

The background art of the present disclosure is disclosed in Korean Patent No. 10-1558658 (registered on Oct. 1, 2015 and entitled 'Head-up display device for vehicle').

SUMMARY

Various embodiments are directed to a head-up display device for a vehicle, in which a moving section quickly opens/closes a combiner by receiving power from a rotating section, thereby improving opening/closing performance, and high resolving power is obtained when adjusting the angle of the combiner.

In an embodiment, a head-up display device for a vehicle may include: a housing section mounted to a vehicle; a moving section reciprocating on the housing section; a holder section coupled to a combiner and rotatably coupled to the moving section; and a rotating section rotating by receiving power from a driving section, connected with the moving section, and transferring power to the moving section.

The head-up display device for a vehicle may further include a tilt section connected to the moving section, and reciprocating on the moving section by rotation of the rotating section to adjust an angle of the combiner.

The rotating section may include a rotating body rotating about a driving shaft; and a driving pin part fixedly coupled to the rotating body, and the moving section may include a moving body slidably moving on the housing section, and formed with a first pin guide part through which the driving pin part passes.

The tilt section may include a tilt body slidably moving on the moving section, and formed with a second pin guide part through which the driving pin part passes.

The first pin guide part may include a first movement path providing a rotation path of the driving pin part to allow the moving body to move on the housing section; and an idle path connected with the first movement path, and formed to have the same curvature as a curvature of a movement locus of the driving pin part.

The second pin guide part may include a second movement path providing a rotation path of the driving pin part to allow the tilt body to move on the housing section; and a tilt path connected with the second movement path, and formed to have a curvature smaller than the curvature of the movement locus of the driving pin part.

The holder section may include a holder shaft rotatably coupled to the moving section; a holder body coupled with the combiner, and coupled to and integrally rotating with the holder shaft; and holder rotating parts coupled to the holder shaft, and rotatably disposed outside the holder body.

The head-up display device for a vehicle may further include a holder guide section fixedly coupled to the housing section, and formed with guide grooves which provide a movement path of the holder section, wherein guide pin parts are formed to project outward from the holder rotating parts, and the guide pin parts move along the guide grooves.

The holder section may further include elastic members formed of an elastic material, and having one ends which are brought into contact with support projections projectingly formed on the holder rotating parts and the other ends which elastically support body projections formed on the holder body.

The tilt section may further include pressing parts coupled to the tilt body, and pressing the body projections, and lower ends of the pressing parts are formed with inclined surfaces which are upwardly inclined toward the body projections.

A projection part may be formed to project outward from the moving section, and the head-up display device for a vehicle may further include an opening/closing sensing section coupled to the housing section, and sensing opening/closing of the combiner by being brought into contact with the projection part when the moving section moves.

The opening/closing sensing section may include an unfolding sensing part coupled to one end of the housing section, and sensing unfolding of the combiner; and a folding sensing part coupled to the other end of the housing section, and sensing folding of the combiner.

In the head-up display device for a vehicle according to the embodiments, unfolding of a combiner may be quickly implemented by converting the rotation power of a rotating section into the reciprocating movement of a moving section.

Also, since the angle of the combiner is adjusted through fine angle adjustment by the rotating section, resolving power may be improved.

Moreover, since the position of the moving section is retained through an idle path and the angle of the combiner is adjusted by a tilt section, resolving power may be improved.

Further, the combiner may be opened/closed by transferring rotation force to a holder body through a holder shaft by holder rotating parts.

In addition, due to the presence of an elastic member, the folding or unfolding of the combiner may be quickly implemented when rotating a holder section, and the adjusted angle of the combiner may be retained.

BRIEF DESCRIPTION OF THE DRAWINGS

FIG. 5 is an exploded view illustrating the moving section in accordance with the embodiment.

FIG. 14 is a side view illustrating a pressing part in accordance with the embodiment.

DETAILED DESCRIPTION

Hereinafter, a head-up display device for a vehicle will be described below with reference to the accompanying drawings through various examples of embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
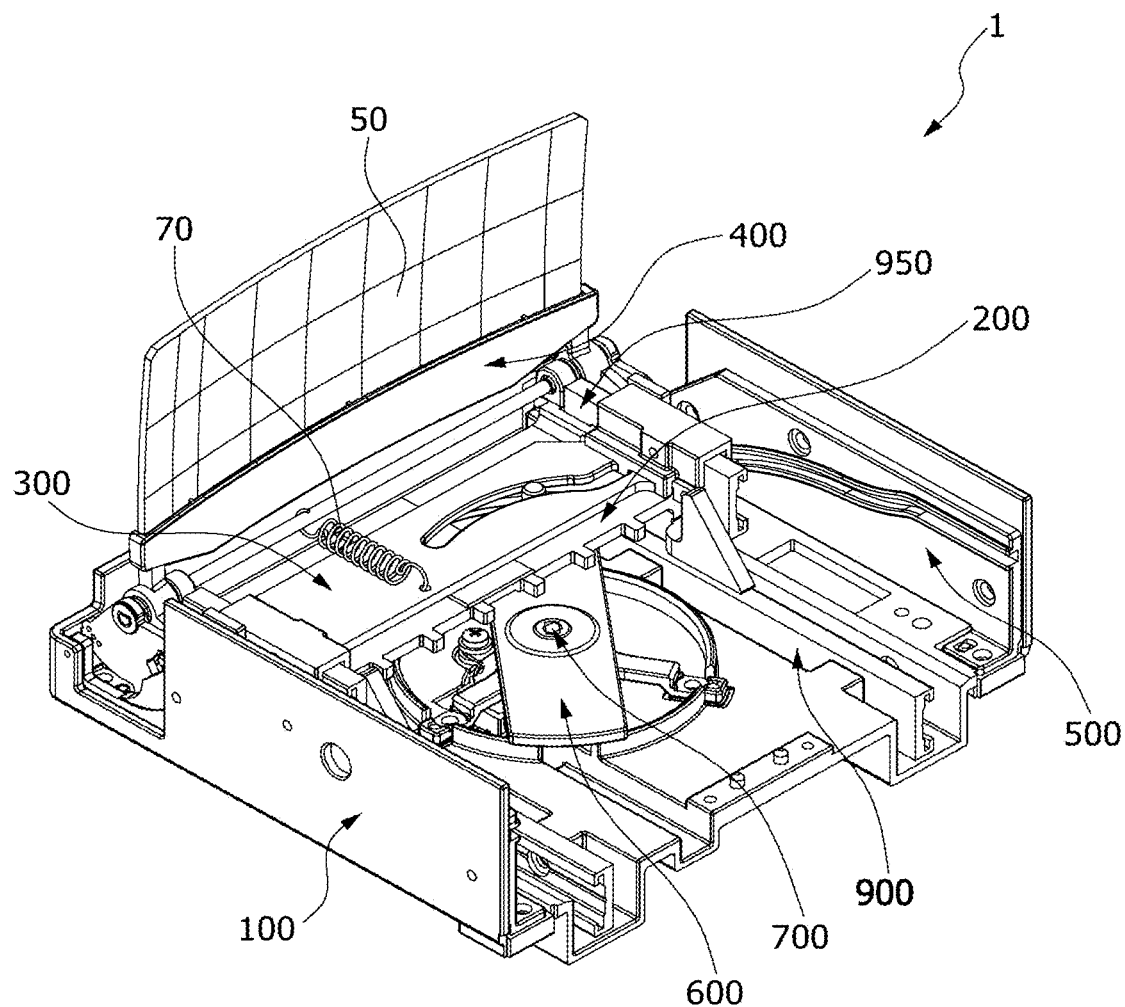
FIG. 1 is a perspective view illustrating a representation of an example of a head-up display device for a vehicle in accordance with an embodiment.
Figure 2:
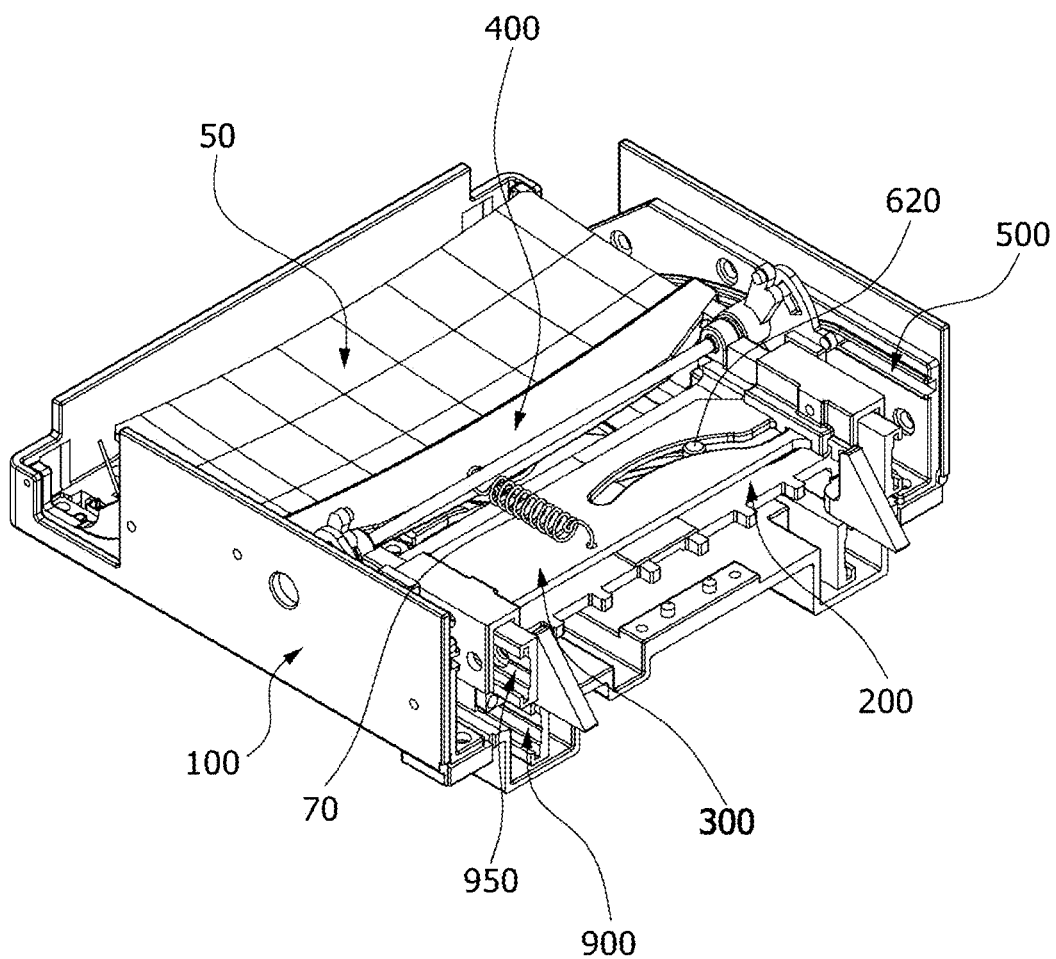
FIG. 2 is a perspective view illustrating the head-up display device for a vehicle, in a state in which a combiner is folded.
Figure 3:
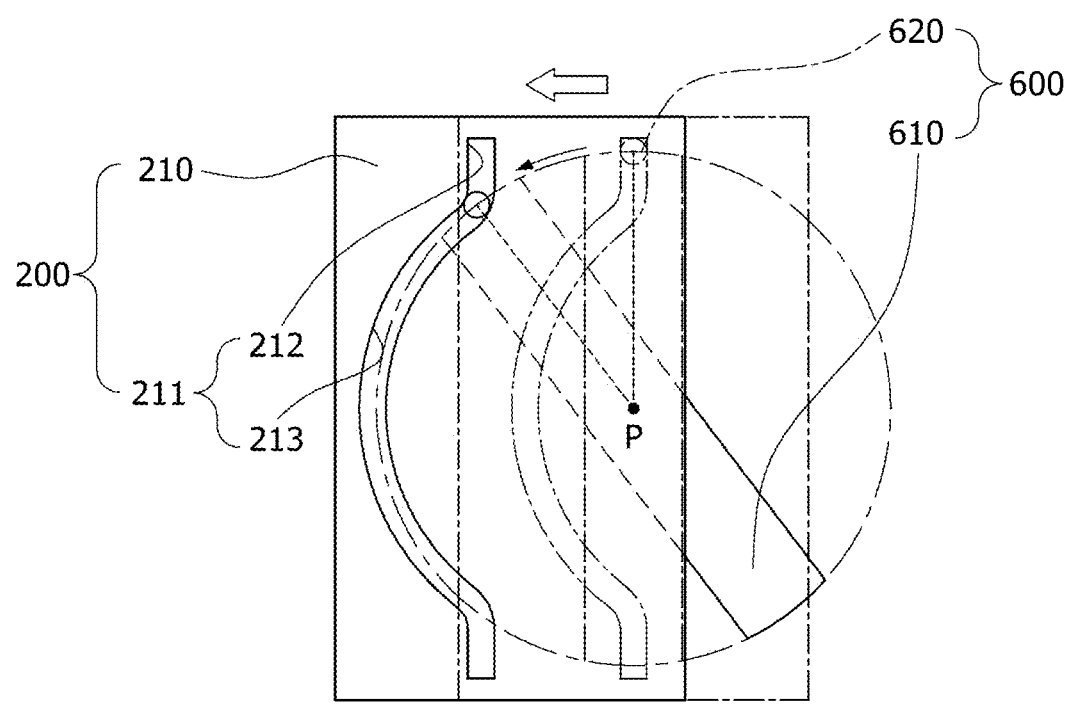
FIG. 3 is a conceptual view illustrating the operation principle of a moving section in accordance with the embodiment.
Figure 4:
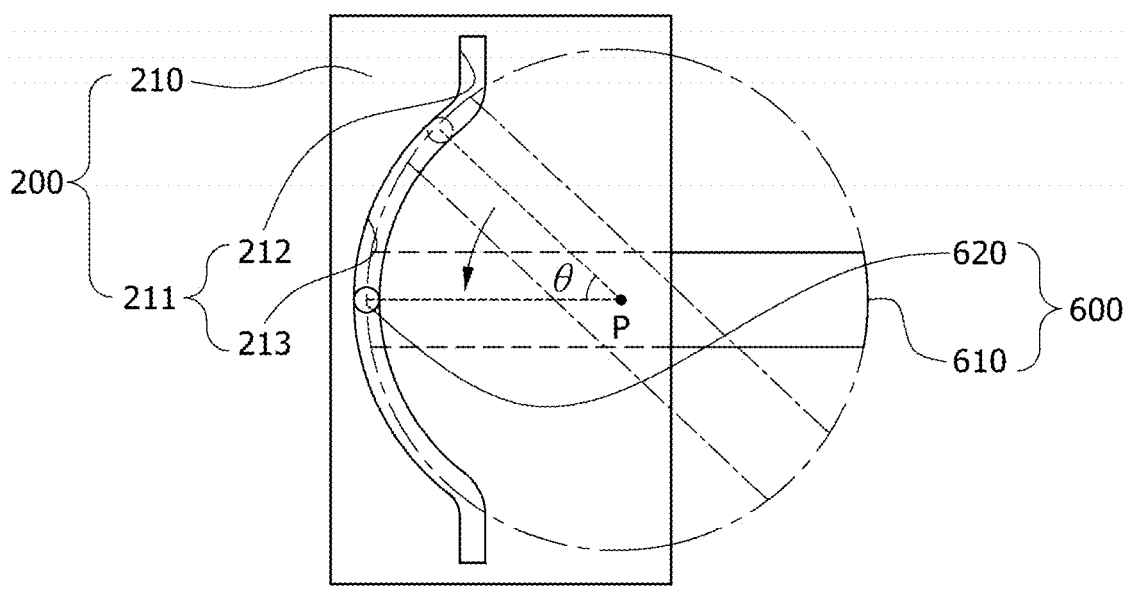
FIG. 4 is a conceptual view illustrating the operation principle of the moving section in accordance with the embodiment.
Figure 6:
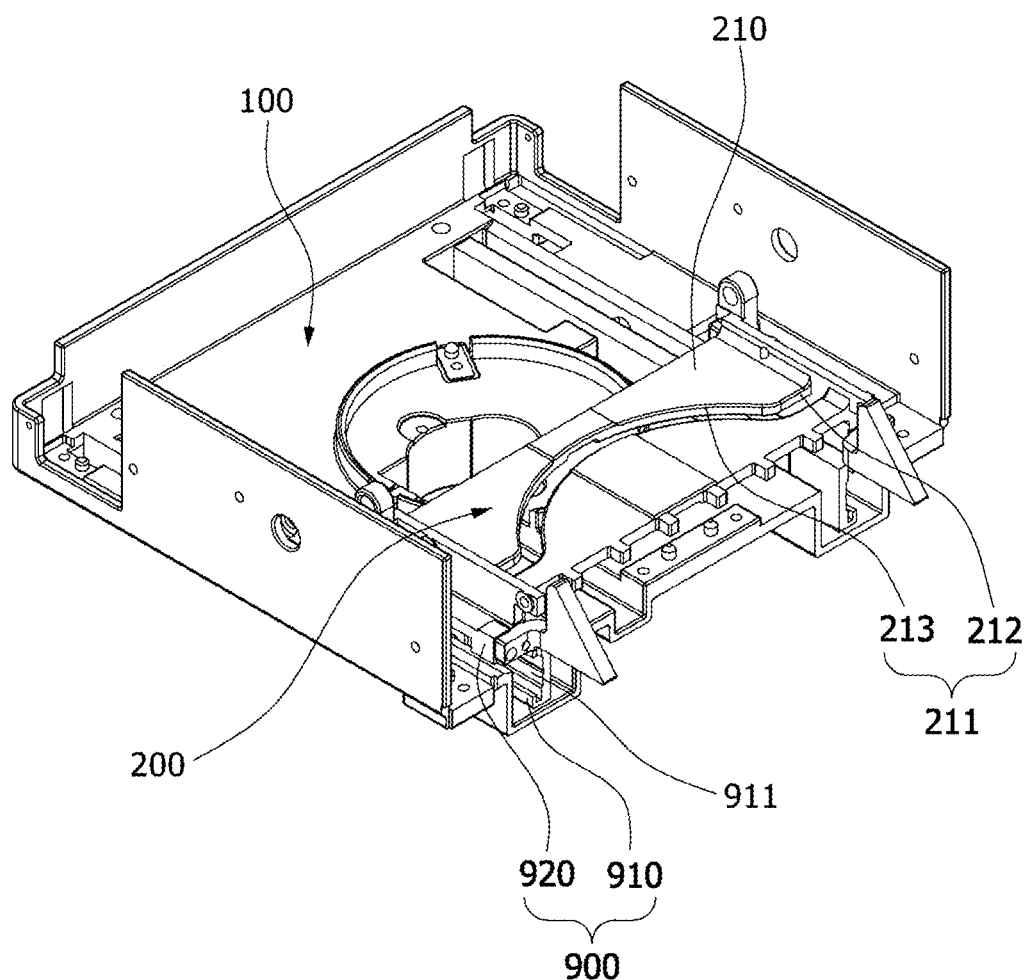
FIG. 6 is a perspective view illustrating the moving section in accordance with the embodiment.
Figure 7:
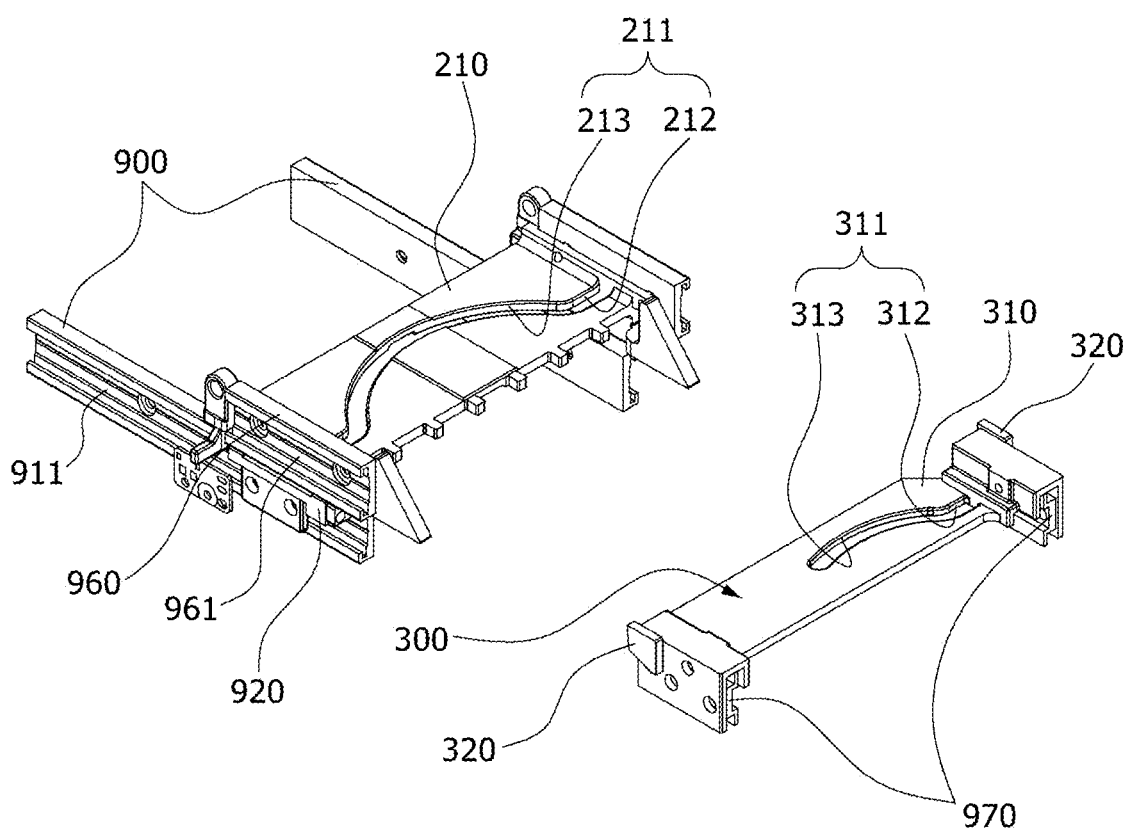
FIG. 7 is a perspective view illustrating a tilt section in accordance with the embodiment.
Figure 8:
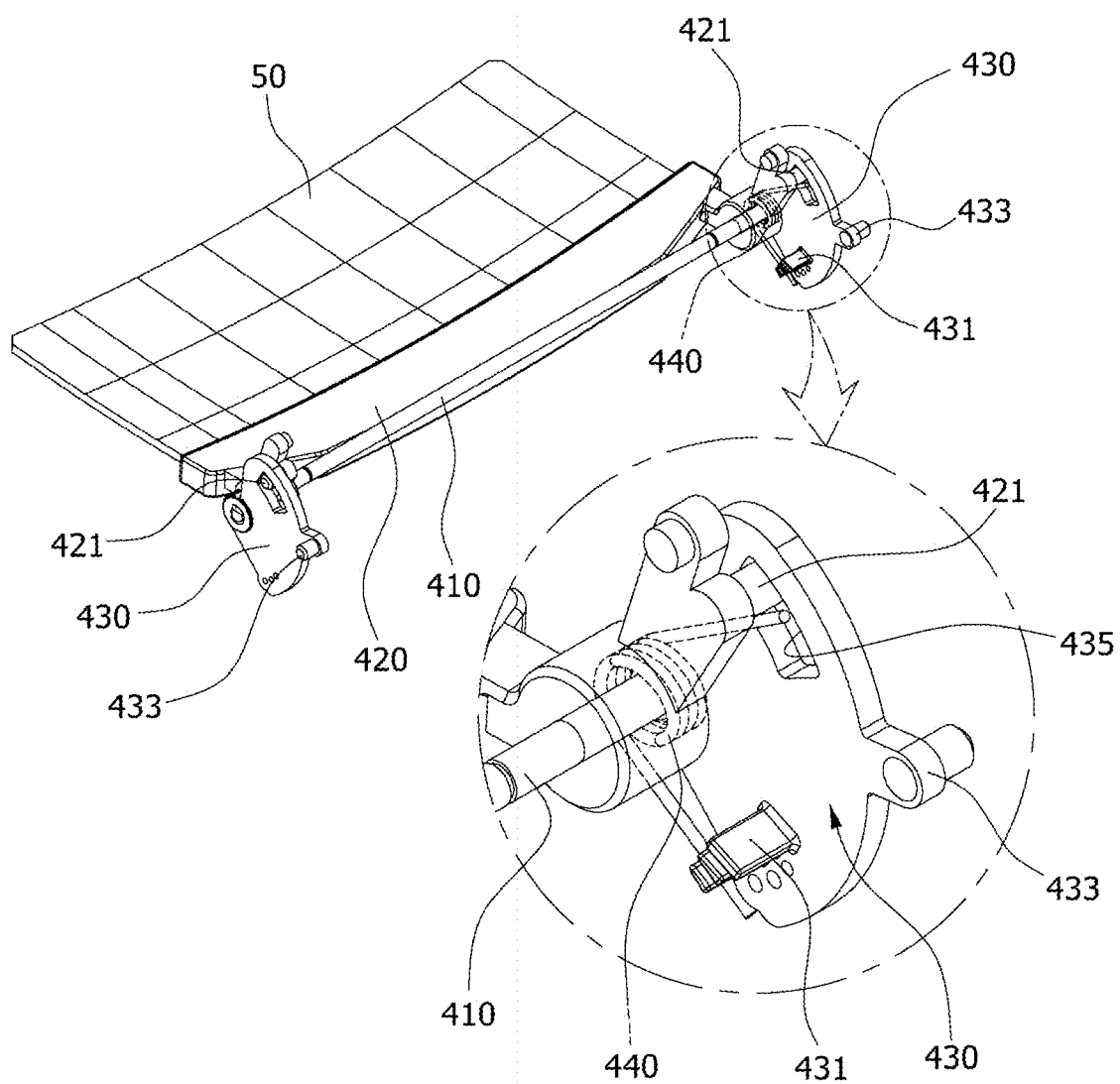
FIG. 8 is a perspective view illustrating a holder section in accordance with the embodiment.
Figure 9:
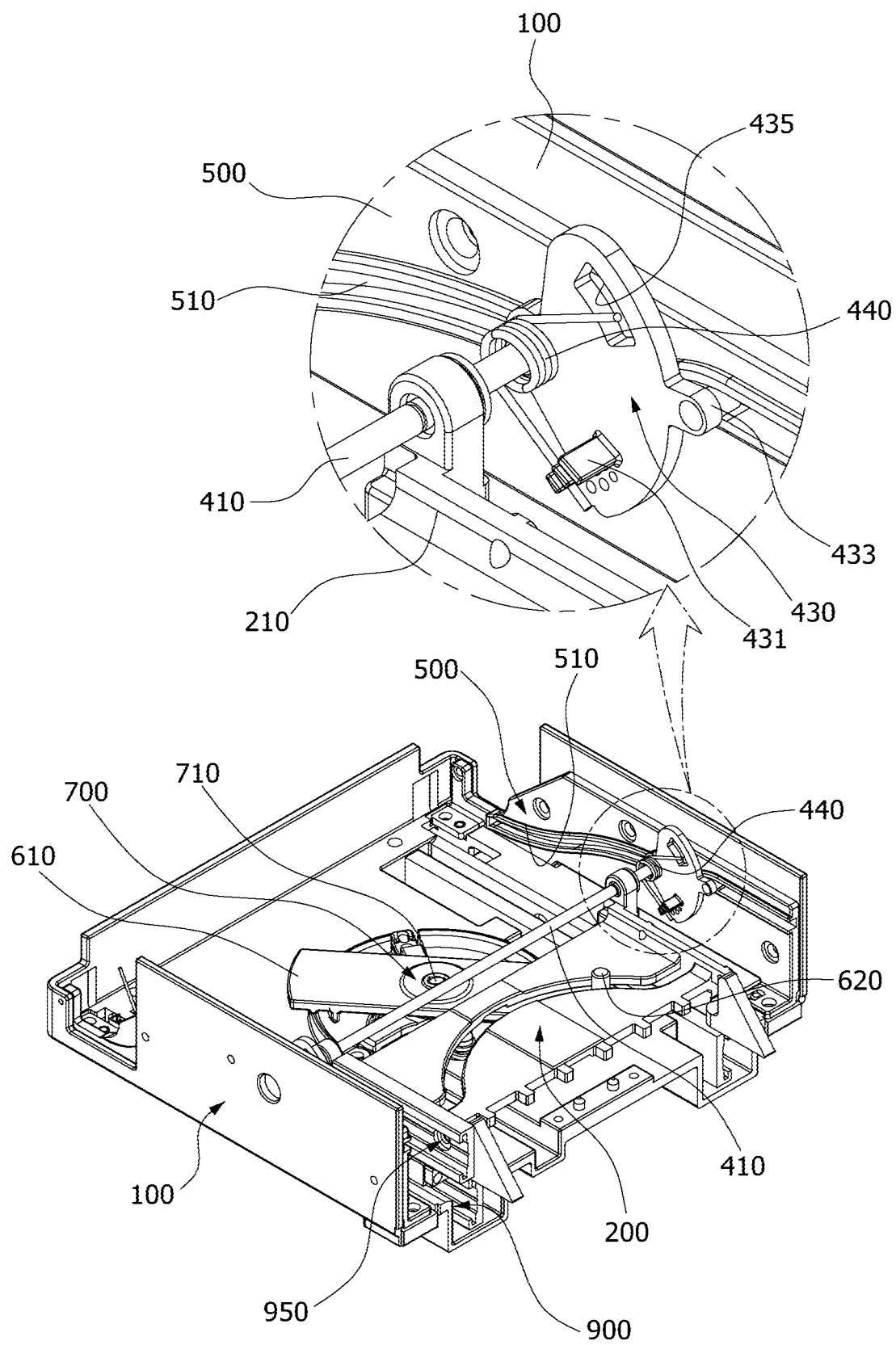
FIG. 9 is a perspective view illustrating a holder guide section in accordance with the embodiment.
Figure 10:
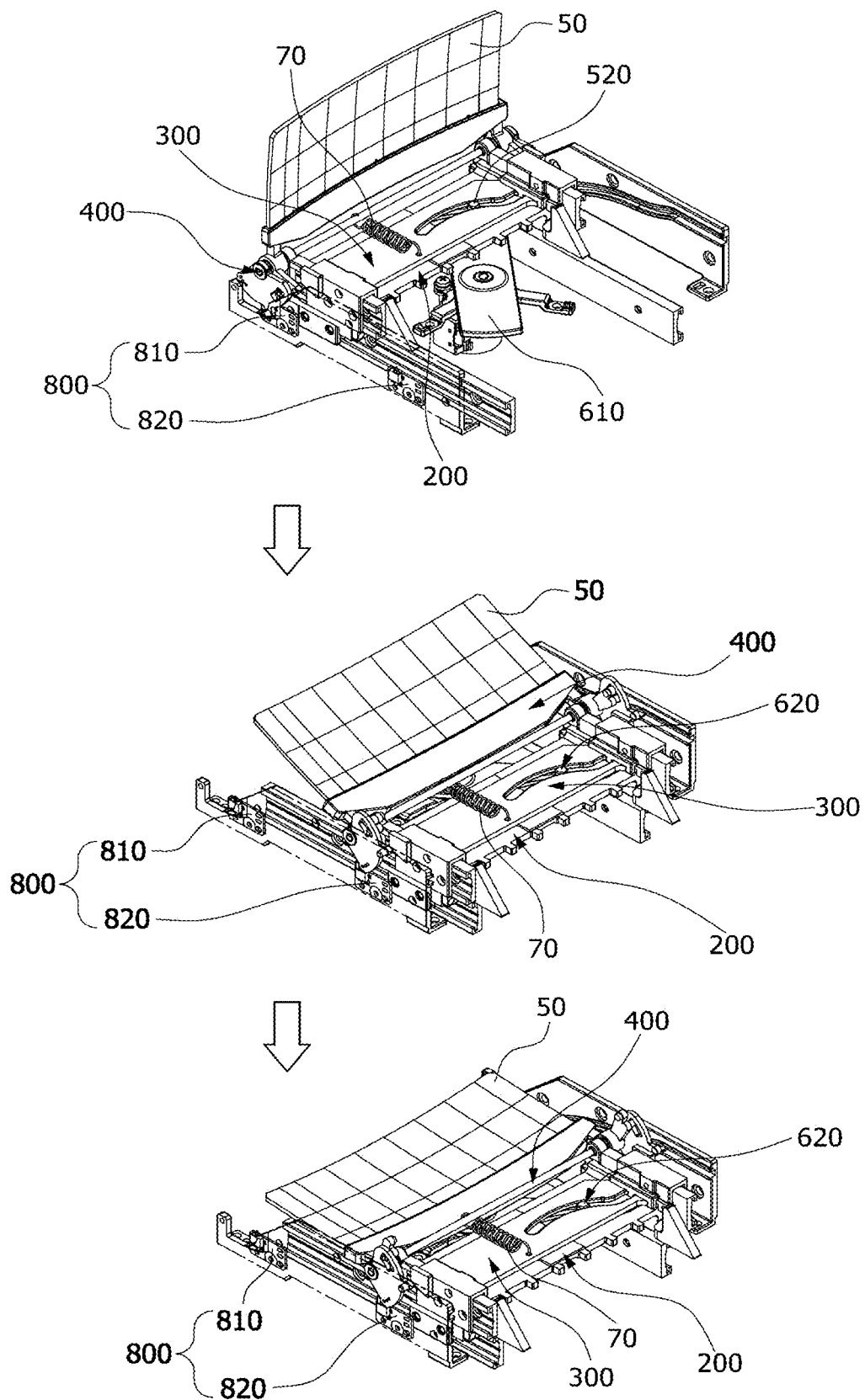
FIG. 10 is a view illustrating the operation states of the head-up display device for a vehicle in accordance with the embodiment.
Figure 11:
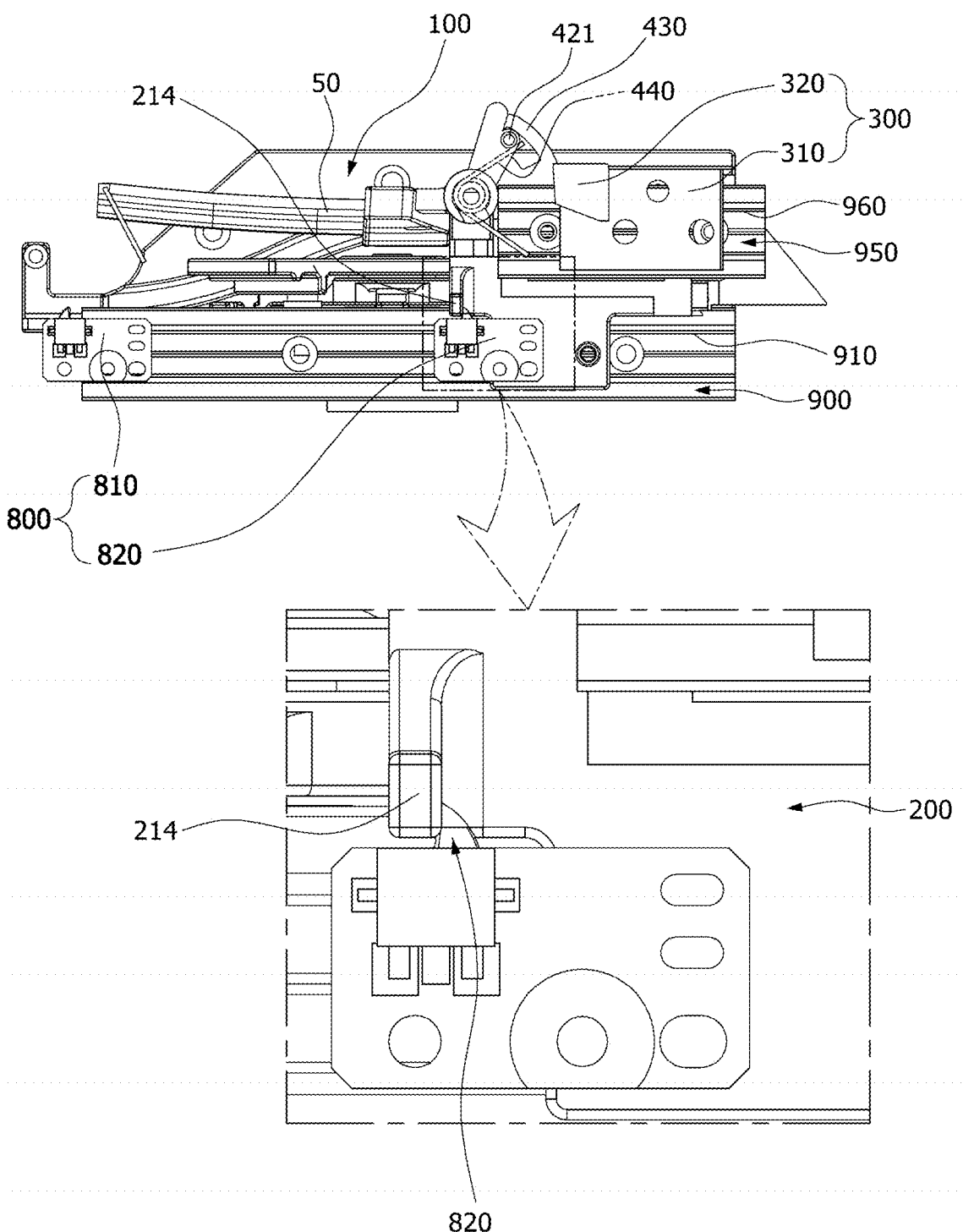
FIG. 11 is a side view illustrating an opening/closing sensing section in accordance with the embodiment.
Figure 12:
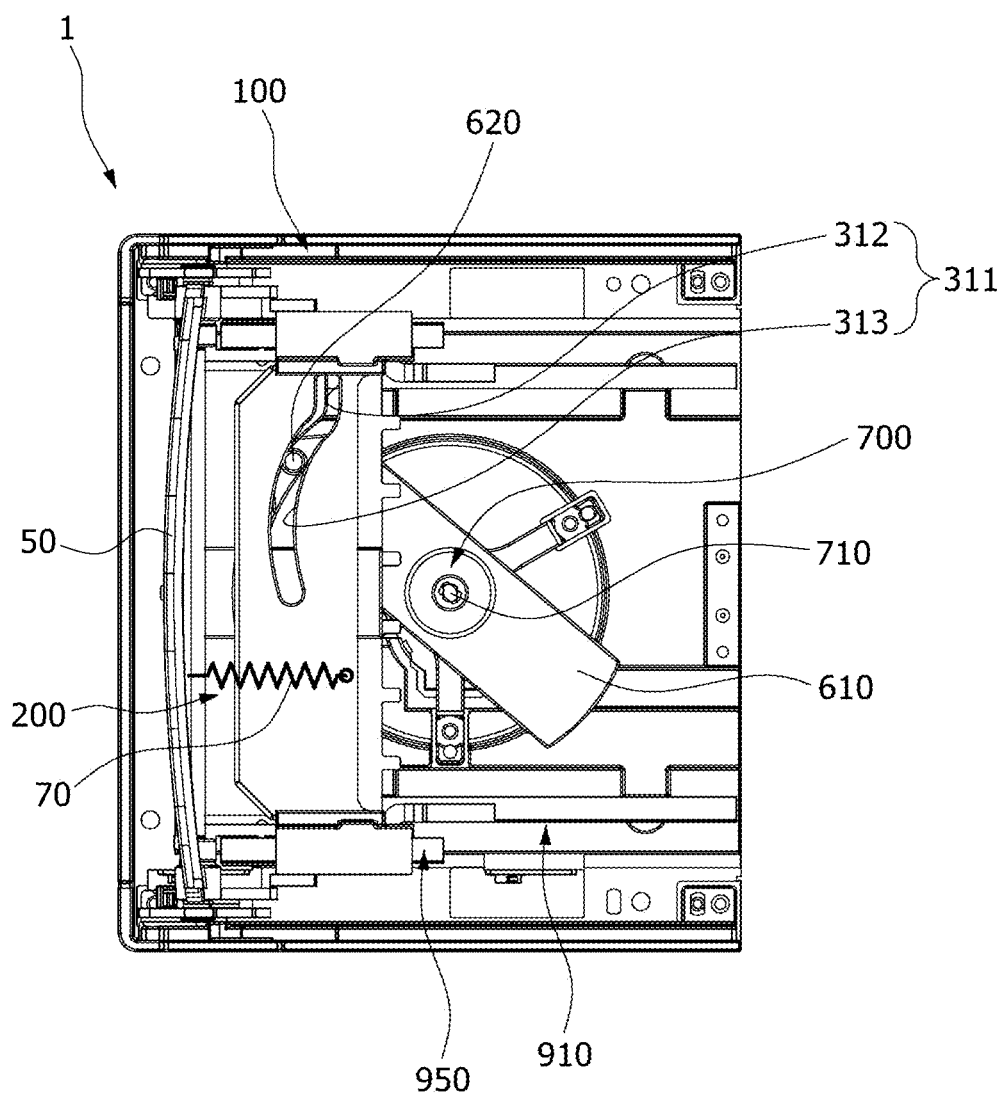
FIG. 12 is a top view illustrating the final position of the moving section in accordance with the embodiment.
Figure 13:
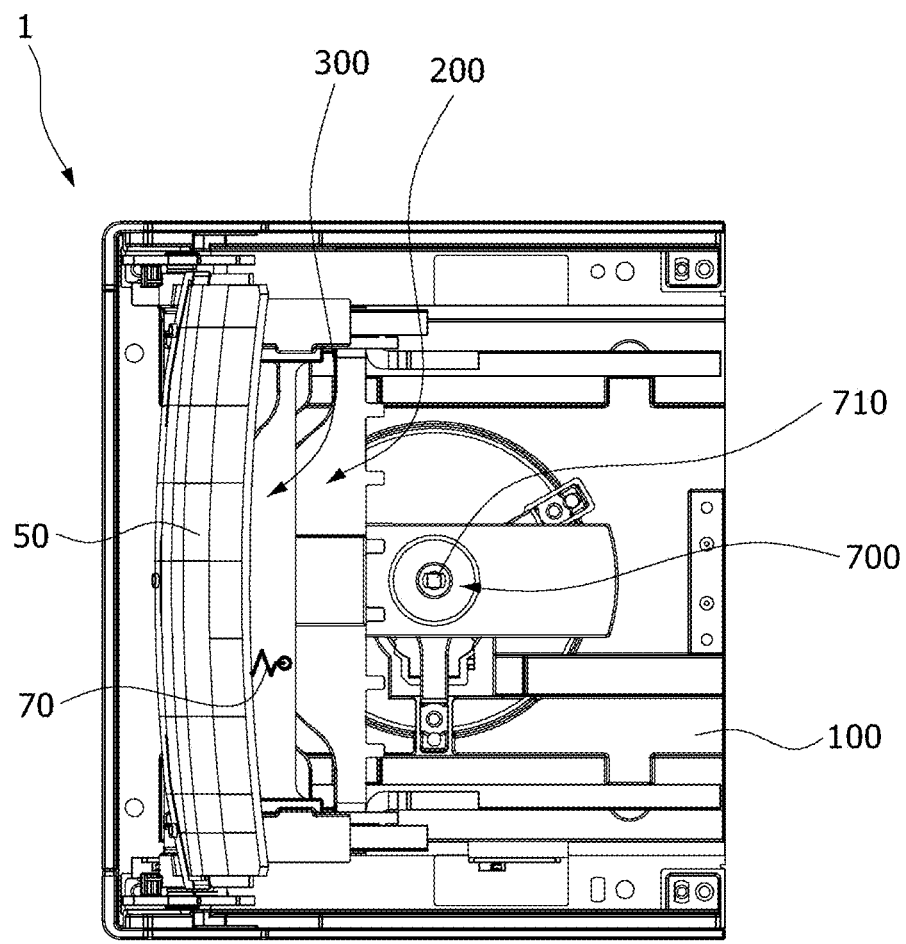
FIG. 13 is a top view illustrating the final position of the tilt section in accordance with the embodiment.
Figure 15:
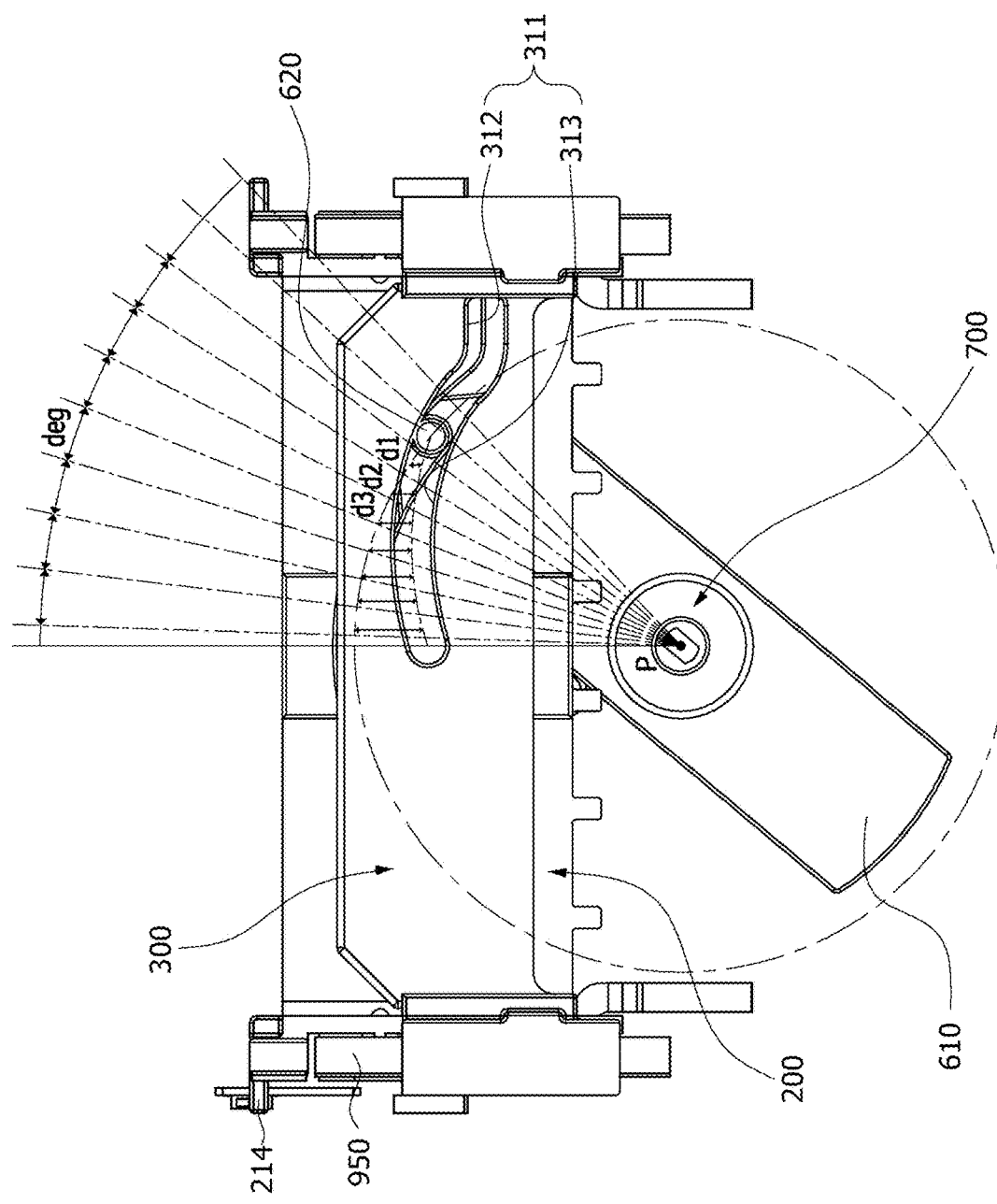
FIG. 15 is a top view illustrating the tilt section in accordance with the embodiment.
Figure 16:
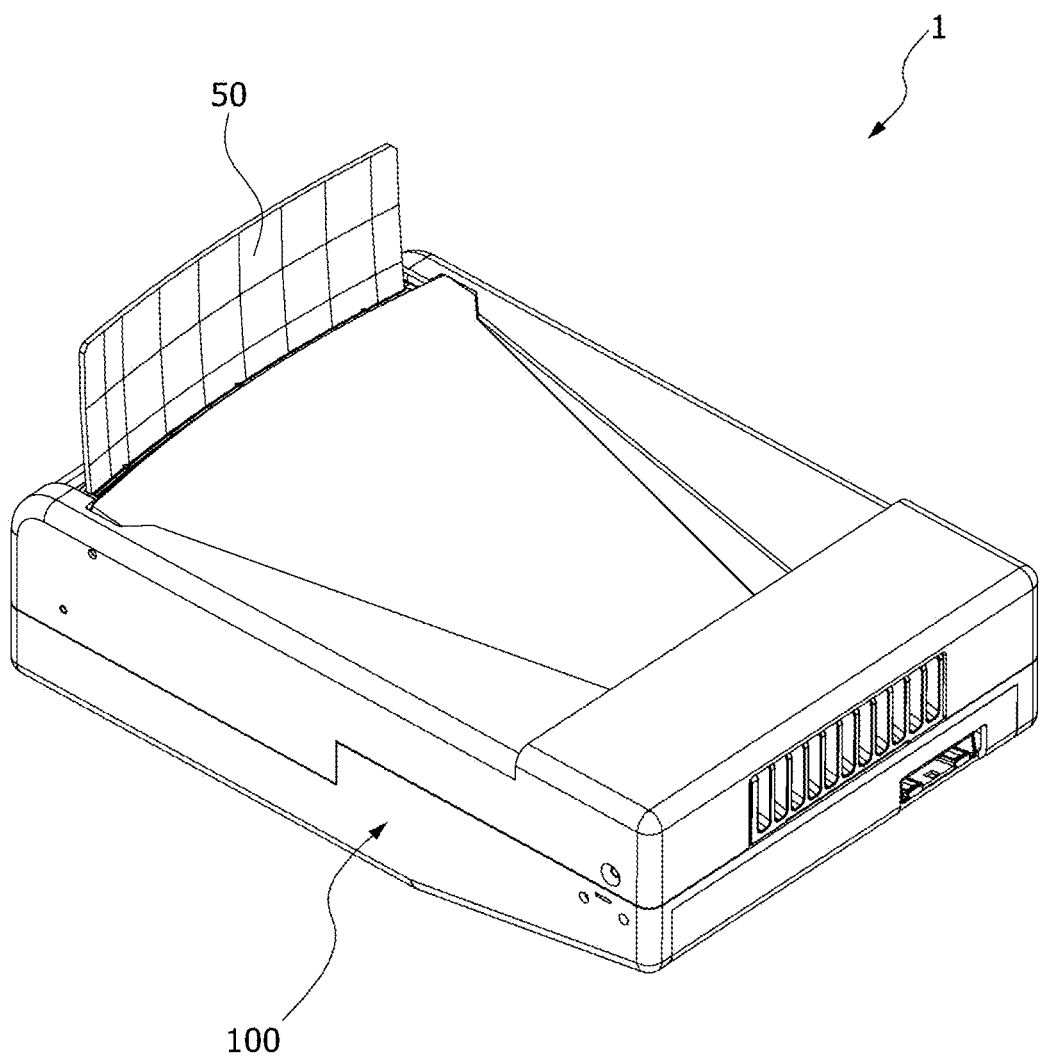
FIG. 16 is a perspective view illustrating the head-up display device for a vehicle, when the combiner is unfolded.
Figure 17:
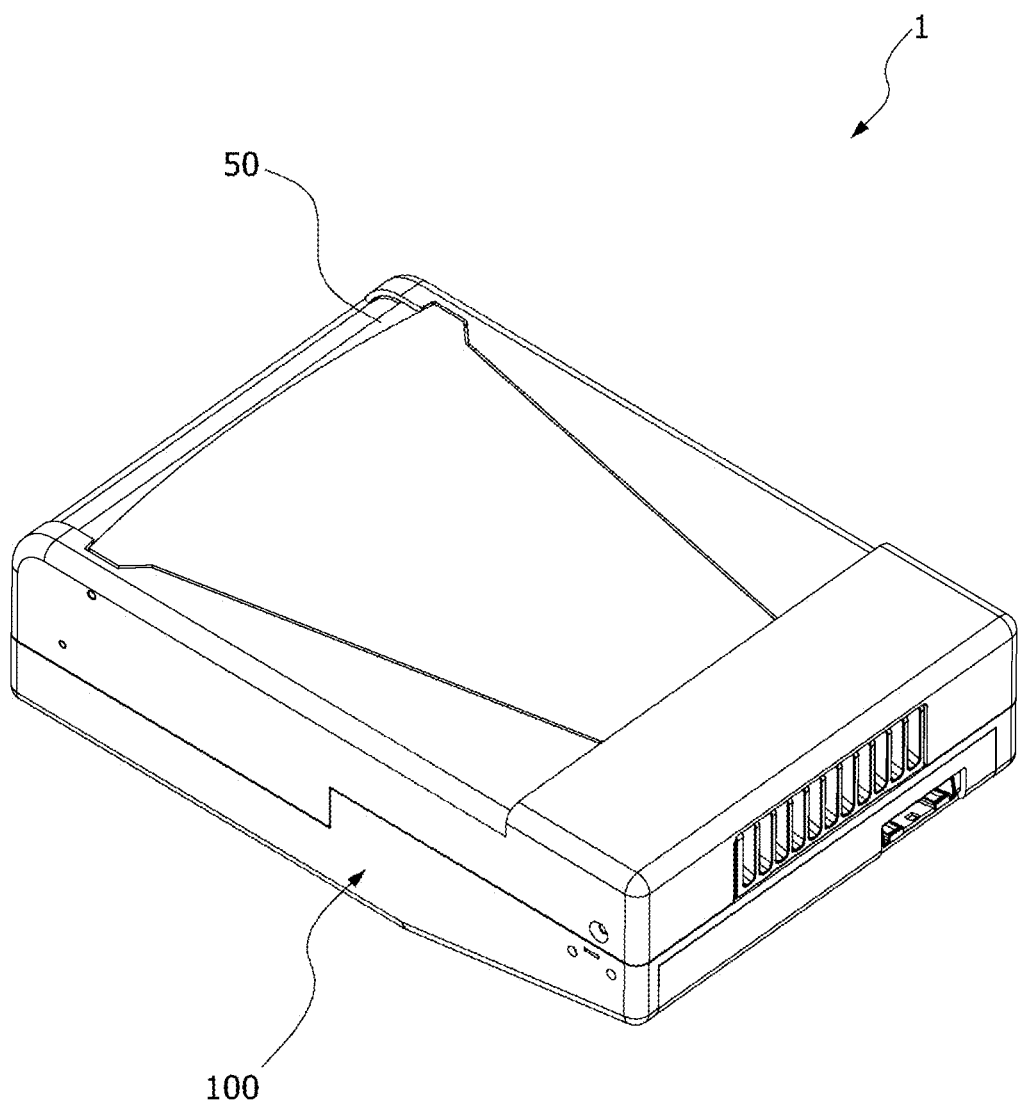
FIG. 17 is a perspective view illustrating the head-up display device for a vehicle, when the combiner is folded.

FIG. 1 is a perspective view illustrating a representation of an example of a head-up display device for a vehicle in accordance with an embodiment. FIG. 2 is a perspective view illustrating the head-up display device for a vehicle, in a state in which a combiner is folded. FIG. 3 is a conceptual view illustrating the operation principle of a moving section in accordance with the embodiment. FIG. 4 is a conceptual view illustrating the operation principle of the moving section in accordance with the embodiment. FIG. 5 is an exploded view illustrating the moving section in accordance with the embodiment. FIG. 6 is a perspective view illustrating the moving section in accordance with the embodiment. FIG. 7 is a perspective view illustrating a tilt section in accordance with the embodiment. FIG. 8 is a perspective view illustrating a holder section in accordance with the embodiment. FIG. 9 is a perspective view illustrating a holder guide section in accordance with the embodiment. FIG. 10 is a view illustrating the operation states of the head-up display device for a vehicle in accordance with the embodiment. FIG. 11 is a side view illustrating an opening/closing sensing section in accordance with the embodiment. FIG. 12 is a top view illustrating the final position of the moving section in accordance with the embodiment. FIG. 13 is a top view illustrating the final position of the tilt section in accordance with the embodiment. FIG. 14 is a side view illustrating a pressing part in accordance with the embodiment. FIG. 15 is a top view illustrating the tilt section in accordance with the embodiment. FIG. 16 is a perspective view illustrating the head-up display device for a vehicle, when the combiner is unfolded. FIG. 17 is a perspective view illustrating the head-up display device for a vehicle, when the combiner is folded.

Referring to FIGS. 1 to 15, a head-up display device 1 for a vehicle in accordance with an embodiment includes a housing section 100, a moving section 200, a tilt section 300, a holder section 400, a holder guide section 500, a rotating section 600, an opening/closing sensing section 800, and a moving slide section 900.

Referring to FIGS. 1, 2, 5, 6, 9 to 13, 16 and 17, the housing section 100 corresponding to the embodiment of the present disclosure, which is mounted to a vehicle, is mounted with a display section (not shown). The display section is mounted in the housing section 100, generates an image or picture and irradiates the image or picture to a combiner 50.

Referring to FIGS. 1 and 2, the housing section 100 is mounted by being inserted into the dashboard (not shown) of the vehicle and is formed with a space therein such that the moving section 200 which will be described later may unfold or fold the combiner 50 while linearly reciprocating.

The display section is connected with an electronic control unit (ECU) which performs general electronic control functions in the vehicle, receives a variety of information regarding the vehicle such as the traveling speed of the vehicle and the state of an engine, and generates an image or picture.

When being connected with a device such as a navigation terminal, the display section receives a variety of position information on a movement route to a specific destination and so forth, and thereby, generates an image or picture.

Referring to FIGS. 1, 2, 5 to 7 and 10 to 15, the moving section 200 in accordance with the embodiment of the present disclosure, which linearly reciprocates on the housing section 100, includes a moving body 210.

Referring to FIGS. 1 and 2, the moving section 200 linearly reciprocates in a left and right direction (in FIG. 1), and opens/closes the combiner 50. The combiner 50 is unfolded on the housing section 100, and the image or picture generated from the display section is irradiated thereon after being reflected through a reflection member such as a mirror (not shown).

Due to this fact, a driver may check vehicle information even without a separate display device such as a navigation. An aspherical lens may be applied as the combiner 50, and may improve the focusing accuracy on a subject so that vehicle information image or picture to be irradiated may be projected clearly.

Referring to FIGS. 5 to 12, the moving body 210 in accordance with the embodiment of the present disclosure, which slidably moves on the housing section 100, is formed with a first pin guide part 211 through which a driving pin part 620 to be described later passes.

Referring to FIGS. 5 to 7, 13 and 14, the first pin guide part 211 in accordance with the embodiment of the present disclosure includes a first movement path 212 and an idle path 213 which are formed to pass through the upper and lower surfaces of the moving body 210 to allow the driving pin part 620 to pass therethrough.

The driving pin part 620 is inserted through the moving body 210 into the first pin guide part 211. When the driving pin part 620 rotates according to the rotation of the rotating section 600 as will be described later, the driving pin part 620 is moved along the first pin guide part 211.

Referring to FIGS. 3 to 5, the first movement path 212 in accordance with the embodiment of the present disclosure is a path by which the moving body 210 is moved in the housing section 100 due to the contact of the moving body 210 with the driving pin part 620 when the driving pin part 620 is rotated by the rotation of a rotating body 610.

While the first movement path 212 is formed as a straight path that is perpendicular to the movement direction of the moving body 210, it is to be noted that the embodiment is not limited thereto. The first movement path 212 may be formed in such a way as to define a predetermined angle with respect to the movement direction of the moving body 210, and various modifications are possible.

Referring to FIGS. 4 and 5, the idle path 213 in accordance with the embodiment of the present disclosure is connected with the first movement path 212, and is formed in the shape of an arc that has the same distance from the center of a driving shaft 710 through a predetermined angle.

Referring to FIG. 5, the idle path 213 in accordance with the embodiment of the present disclosure is formed to have the same curvature as the movement locus of the driving pin part 620, and accordingly, the moving body 210 does not move and retains its position even when the driving pin part 620 is rotated by the rotation of the rotating section 600 as will be described later.

Referring to FIGS. 5 to 7, 10 and 11, a projection part 214 in accordance with the embodiment of the present disclosure, which is formed to project outward from the moving section 200, is brought into contact with the opening/closing sensing section 800 which will be described later.

A signal generation part (not shown) which transfers a signal when the projection part 214 is brought into contact with the opening/closing sensing section 800 may be coupled to the projection part 214.

Referring to FIGS. 1, 2, 7 and 11 to 15, the tilt section 300 in accordance with the embodiment of the present disclosure, which is connected to the moving section 200 and linearly reciprocates on the moving section 200 by the rotation movement of the rotating section 600 to adjust the angle of the combiner 50, includes a tilt body 310 and pressing parts 320.

Referring to FIGS. 1, 2, 7 and 11 to 15, the tilt body 310 in accordance with the embodiment of the present disclosure slidably moves on the moving section 200, and is formed with a second pin guide part 311.

Referring to FIGS. 7, 12 and 13, the second pin guide part 311 in accordance with the embodiment of the present disclosure includes a second movement path 312 and a tilt path 313 which are formed to pass through the upper and lower surfaces (in FIG. 7) of the tilt body 310 to allow the driving pin part 620 to pass therethrough.

Referring to FIGS. 12 to 15, the second movement path 312 in accordance with the embodiment of the present disclosure is a path by which the tilt body 310 is moved on the moving section 200 due to the contact of the tilt body 310 with the driving pin part 620 when the driving pin part 620 is rotated by the rotation of the rotating body 610.

While the second movement path 312 is formed as a straight path that is perpendicular to the movement direction of the tilt body 310, it is to be noted that the embodiment is not limited thereto. The second movement path 312 may be formed in such a way as to define a predetermined angle with respect to the movement direction of the tilt body 310, and various modifications are possible.

Referring to FIG. 7, the tilt path 313 in accordance with the embodiment of the present disclosure is connected with the second movement path 312, and is formed to have a curvature smaller than the curvature of the movement locus of the driving pin part 620.

Due to this fact, when the driving pin part 620 moves in the idle path 213 and the tilt path 313, the moving body 210 does not move, but the tilt body 310 moves toward the combiner 50.

In addition, as the driving pin part 620 rotates, the moving body 210 does not move in the idle path 213, but the tilt body 310 moves due to the presence of the tilt path 313 to enable fine adjustment.

While, in the embodiment of the present disclosure, the route of the tilt path 313 is formed to have a curvature smaller than the curvature of the movement locus of the driving pin part 620, it is to be noted that the embodiment is not limited thereto. The route of the tilt path 313 may be formed to have a curvature larger than the curvature of the movement locus of the driving pin part 620 such that, as the driving pin part 620 moves in the idle path 213, the moving body 210 does not move but the tilt body 310 moves, and various modifications are possible.

Referring to FIGS. 12 to 15, the tilt path 313 in accordance with the embodiment of the present disclosure is formed in the shape of an arc of which distance from the center of the driving shaft 710 continuously changes.

In detail, the tilt path 313 is formed in such a manner that the distance from a point on the tilt path 313 when the rotating section 600 is rotated by a certain angle, to the center of the driving shaft 710 is larger than the distance from a point where the tilt path 313 is connected with the second movement path 312, to the center of the driving shaft 710.

Referring to FIGS. 12 and 13, when the driving pin part 620 moves in the idle path 213, the moving body 210 does not move any more in the left direction (in FIG. 12), and the tilt body 310 moves in the left direction (in FIG. 12) on the moving section 200, specifically, the moving body 210.

Referring to FIG. 15, the tilt path 313 is formed such that, when the rotating body 610 rotates by a predetermined angle, the tilt body 310 may linearly move in the upward direction (in FIG. 15) by a predetermined length in proportion to the rotation of the rotating body 610.

Referring to FIGS. 7 and 10 to 15, the pressing parts 320 in accordance with the embodiment of the present disclosure, which are coupled to the tilt body 310, press body projections 421 which are formed on a holder body 420 to be described later.

Referring to FIG. 14, the lower ends (in FIG. 14) of the pressing parts 320 are formed with inclined surfaces which are upwardly inclined toward the body projections 421 (the left side in FIG. 14).

Due to this fact, when the tilt body 310 moves in the left direction (in FIG. 14), the pressing parts 320 are brought into contact with the body projections 421, and as the tilt body 310 continuously moves, the holder body 420 is rotated in the clockwise direction (in FIG. 14), by which the inclination of the combiner 50 is adjusted.

Referring to FIGS. 1, 2 and 8 to 15, the holder section 400 in accordance with the embodiment of the present disclosure, which is coupled with the combiner 50 and is rotatably coupled to the moving section 200, includes a holder shaft 410, the holder body 420, holder rotating parts 430 and elastic members 440.

Referring to FIGS. 8 to 15, the holder shaft 410 in accordance with the embodiment of the present disclosure, which is rotatably coupled to the moving section 200, may be formed in the shape of a rod.

Referring to FIGS. 8 to 15, the holder body 420 in accordance with the embodiment of the present disclosure is coupled with the combiner 50 and is coupled to the holder shaft 410 to be rotated integrally therewith. As the holder shaft 410 rotates on the moving section 200, the holder body 420 unfolds or folds the combiner 50.

Referring to FIGS. 8 to 15, the body projections 421 in accordance with the embodiment of the present disclosure are formed to project outward from the holder body 420, and are brought into contact with the elastic members 440 which will be described later.

The body projections 421 are brought into contact with the pressing parts 320 as the tilt body 310 moves. As the pressing parts 320 are moved toward the body projections 421 (the left side in FIG. 14), the body projections 421 are rotated downward (in FIG. 14), specifically, in the clockwise direction (in FIG. 14).

Referring to FIG. 14, the body projections 421 in accordance with the embodiment of the present disclosure are movable in body projection guide parts 435 which are formed in the holder rotating parts 430.

Due to this fact, if the pressing parts 320 press the body projections 421, the body projections 421 are moved in the body projection guide parts 435, and the holder body 420 is rotated in the clockwise direction.

Referring to FIGS. 8 to 15, the holder rotating parts 430 in accordance with the embodiment of the present disclosure are coupled to the holder shaft 410. Guide pin parts 433 in accordance with the embodiment of the present disclosure are formed to project outward from the holder rotating parts 430.

Referring to FIGS. 8 to 15, support projections 431 in accordance with the embodiment of the present disclosure are formed to project outward from the holder rotating parts 430, and are brought into contact with and support the elastic members 440 which will be described later.

Referring to FIGS. 9 to 13, the guide pin parts 433 in accordance with the embodiment of the present disclosure move along guide grooves 510 which are formed in the holder guide section 500 as will be described later. As the guide pin parts 433 are engaged with the ends of the guide grooves 510 and rotate the holder shaft 410 and the holder body 420 about the ends of the guide grooves 510, the combiner 50 is rotated and unfolded in the clockwise direction (in FIG. 12).

Referring to FIGS. 8 to 15, the body projection guide parts 435 in accordance with the embodiment of the present disclosure are formed to allow the body projections 421 to move on the holder rotating parts 430.

Due to this fact, even though the holder rotating parts 430 do not rotate any more, as the pressing parts 320 press the body projections 421, the body projections 421 may move in the body projection guide parts 435 and rotate the combiner 50 by a predetermined angle in the clockwise direction (in FIG. 14).

Referring to FIGS. 8 and 14, the elastic members 440 in accordance with the embodiment of the present disclosure, which are formed of an elastic material, have one ends which are brought into contact with the support projections 431 and the other ends which are brought into contact with the body projections 421.

The elastic members 440 in accordance with the embodiment of the present disclosure surround the holder shaft 410. One ends of the elastic members 440 are fixed in position by the support projections 431, and the other ends of the elastic members 440 support the lower sides (in FIG. 8) of the body projections 421.

The elastic members 440 elastically support the body projections 421 such that the holder body 420 is rotatably biased in the counterclockwise direction (in FIG. 14).

Referring to FIGS. 1, 2 and 9 to 13, the holder guide section 500 in accordance with the embodiment of the present disclosure, which is fixedly coupled to the housing section 100, provides the movement path of the holder section 400.

The guide pin parts 433 which are formed on the holder rotating parts 430 are moved along the guide grooves 510 in accordance with the embodiment of the present disclosure. Referring to FIG. 9, the guide grooves 510 in accordance with the embodiment of the present disclosure are formed to extend gradually downward from the right end toward the left end (in FIG. 9).

Due to this fact, when the moving section 200 linearly moves at the same height, the height of the guide pin parts 433 is changed. Thus, while the guide pin parts 433 move in the left direction (in FIG. 9), as the height of the guide pin parts 433 decreases, the holder rotating parts 430 are rotated in the clockwise direction (in FIG. 14).

Referring to FIGS. 1, 2, 10 to 13 and 15, the rotating section 600 in accordance with the embodiment of the present disclosure, which rotates by receiving power from a driving section 700, is connected with the moving section 200 and transfers power to the moving section 200.

The rotating section 600 in accordance with the embodiment of the present disclosure includes the rotating body 610 and the driving pin part 620.

Referring to FIGS. 1, 2, 10 to 13 and 15, the rotating body 610 in accordance with the embodiment of the present disclosure rotates about the driving shaft 710, and the driving pin part 620 is fixedly coupled to the rotating body 610.

The driving pin part 620 is formed to project outward from the rotating body 610, passes through the first pin guide part 211 and the second pin guide part 311, and moves along the first pin guide part 211 and the second pin guide part 311.

The driving pin part 620 in accordance with the embodiment of the present disclosure may be coupled to the rotating body 610 in such a way as to be fixed in its position, and may be formed integrally with the rotating body 610.

The driving section 700 in accordance with the embodiment of the present disclosure is rotatably driven by being supplied with electric power in a motor type, and transfers power to allow the rotating body 610 to rotate about the driving shaft 710.

The driving pin part 620 in accordance with the embodiment of the present disclosure is rotated by a desired angle as the rotating body 610 rotates, and is moved along the first pin guide part 211 and the second pin guide part 311.

Referring to FIGS. 5, 7 and 11, the opening/closing sensing section 800 in accordance with the embodiment of the present disclosure is coupled to the housing section 100, and senses the opening/closing of the combiner 50 by being brought into contact with the projection part 214 when the moving section 200 moves. The opening/closing sensing section 800 includes an unfolding sensing part 810 and a folding sensing part 820.

The opening/closing sensing section 800 in accordance with the embodiment of the present disclosure is formed in the type of a switch, but it is to be noted that the embodiment is not limited thereto. The opening/closing sensing section 800 may be formed in the type of a contact sensor which generates an electrical signal upon contact with the projection part 214, and various modifications are possible.

Referring to FIGS. 5, 7 and 11, the unfolding sensing part 810 in accordance with the embodiment of the present disclosure is coupled to one side of the housing section 100, and senses the unfolding of the combiner 50. The unfolding sensing part 810 senses the unfolding of the combiner 50 by being brought into contact with the projection part 214 when the moving body 210 moves.

In detail, in the embodiment of the present disclosure, the unfolding sensing part 810 senses the unfolding of the combiner 50 by being brought into contact with the left side surface (in FIG. 11) of the projection part 214.

Referring to FIGS. 5, 7 and 11, the folding sensing part 820 in accordance with the embodiment of the present disclosure is coupled to the one side of the housing section 100, and senses the folding of the combiner 50. The folding sensing part 820 senses the folding of the combiner 50 by being brought into contact with the projection part 214 when the moving body 210 moves.

In detail, in the embodiment of the present disclosure, the folding sensing part 820 senses the folding of the combiner 50 by being brought into contact with the right side surface (in FIG. 11) of the projection part 214.

Referring to FIGS. 1, 2 and 5 to 7, the moving slide section 900 in accordance with the embodiment of the present disclosure is installed on the housing section 100, and includes moving guide parts 910 and moving slide blocks 920.

Referring to FIGS. 1, 2 and 5 to 7, the moving guide parts 910 in accordance with the embodiment of the present disclosure are installed on the housing section 100, and are formed with moving guide grooves 911 to allow the moving slide blocks 920 to move.

The moving guide grooves 911 in accordance with the embodiment of the present disclosure are formed in the form of rails, and the moving slide blocks 920 are moved by linearly reciprocating in the moving guide grooves 911.

Referring to FIGS. 1, 2 and 5 to 7, the moving slide blocks 920 are coupled to the moving body 210. As the moving slide blocks 920 move in the moving guide grooves 911, the moving body 210 linearly reciprocates.

Referring to FIGS. 1, 2 and 5 to 7, a tilt slide section 950 in accordance with the embodiment of the present disclosure is installed on the moving section 200, and includes tilt guide parts 960 and tilt slide blocks 970.

Referring to FIGS. 1, 2 and 5 to 7, the tilt guide parts 960 in accordance with the embodiment of the present disclosure are installed on the moving section 200, specifically, the moving body 210, and are formed with tilt guide grooves 961 to allow the tilt slide blocks 970 to move.

The tilt guide grooves 961 in accordance with the embodiment of the present disclosure are formed in the form of rails, and the tilt slide blocks 970 are moved by linearly reciprocating in the tilt guide grooves 961.

Referring to FIGS. 1, 2 and 5 to 7, the tilt slide blocks 970 are coupled to the tilt body 310. As the tilt slide blocks 970 move in the tilt guide grooves 961, the tilt body 310 linearly reciprocates.

Referring to FIGS. 1, 2, 10, 12 and 13, a play prevention part 70 in accordance with the embodiment of the present disclosure is coupled to the holder shaft 410 and the tilt body 310, and has elastic returning force in a direction in which the tilt body 310 is moved toward the holder shaft 410.

Due to this fact, when the driving pin part 620 moves along the second pin guide part 311 which is formed in the tilt body 310, the driving pin part 620 is brought into close contact with, specifically, the second movement path 312 and the tilt path 313, by which it is possible to prevent a play from occurring between the second pin guide part 311 and the driving pin part 620.

As a consequence, it is possible to prevent a vibration due to the occurrence of a play between the driving pin part 620 and the second pin guide part 311, and it is possible to finely adjust the moving distance of the tilt body 310 which is moved according to the driving of the rotating section 600.

Hereinafter, the operation principle and effects of the head-up display device 1 for a vehicle in accordance with the embodiment of the present disclosure will be described.

Referring to FIGS. 1 to 15, the rotating section 600 rotates by receiving power from the driving section 700 and transfers power to the moving section 200, and the moving section 200 linearly reciprocates in the left and right direction (in FIG. 1) on the housing section 100.

Due to the rotation of the rotating section 600, the repetitive horizontal movement of the moving section 200 becomes possible. In addition, by receiving the rotation speed of the rotating section 600, it is possible to quickly deploy or receive the combiner 50.

Referring to FIGS. 1 and 2, when the moving section 200 in accordance with the embodiment of the present disclosure moves leftward (in FIG. 1), the combiner 50 is raised and unfolded in the clockwise direction (in FIG. 1) inside the housing section 100. When the moving section 200 moves rightward (in FIG. 2), the combiner 50 is lowered, folded and received in the counterclockwise direction (in FIG. 2) inside the housing section 100.

Referring to FIGS. 3 and 4, as the rotating body 610 in accordance with the embodiment of the present disclosure is rotated, the driving pin part 620 which is fixedly coupled to the rotating body 610 rotates together. As the rotating section 600 is rotated, the driving pin part 620 moves along the first pin guide part 211, and the moving body 210 is moved.

Referring to FIG. 4, the first pin guide part 211 includes the first movement path 212 and the idle path 213. The moving body 210 linearly moves when the driving pin part 620 moves along the first movement path 212, but the position of the moving body 210 is retained when the driving pin part 620 moves along the idle path 213.

Due to this fact, while the position of the moving section 200 is retained through a predetermined angle section θ, the tilt body 310 linearly moves by the rotation of the rotating section 600, by which it is possible to adjust the angle of the combiner 50.

Referring to FIGS. 5 and 6, the moving section 200 linearly reciprocates on the housing section 100, and is moved by receiving power from the rotation of the rotating section 600.

Referring to FIGS. 1, 2 and 3, the tilt section 300 is linearly moved on the moving body 210. In detail, when the rotating section 600 rotates, the driving pin part 620 moves along the second pin guide part 311, and the tilt body 310 is linearly moved on the moving body 210 by the driving pin part 620.

Referring to FIGS. 11 to 15, the arc shape of the second pin guide part 311 is formed to be closer to a center point P than the arc shape of the first pin guide part 211. Due to this fact, while the moving body 210 does not move through the idle path 213 of the first pin guide part 211, the tilt body 310 may move leftward (in FIG. 12) relative to the moving body 210.

Referring to FIG. 15, the idle path 213 is formed such that the linear movement distance of the tilt body 310 regularly increases while the rotating section 600 rotates through a predetermined angle from a point where the tilt path 313 starts.

In the head-up display device 1 for a vehicle in accordance with the embodiment of the present disclosure, the tilt body 310 moves by L each time the rotating section 600 rotates by a preselected angle. This may be expressed by the following equation.

$$d_n = d_{n-1} + L (n > 1 \text{ and } d_1 = L) \qquad \text{[Equation 1]}$$

Due to the tilt path 313 in accordance with the embodiment of the present disclosure, the movement distance of the tilt body 310 according to the rotation angle of the rotating section 600 may be accurately predicted, and the combiner 50 may be adjusted to a designed angle through the movement distance of the tilt body 310.

Referring to FIGS. 1 to 8, the holder section 400 is rotatably coupled to the moving section 200, and includes the holder shaft 410, the holder body 420 and the holder rotating parts 430.

The holder rotating parts 430 are coupled to the holder shaft 410 and rotate the holder shaft 410, and the guide pin parts 433 formed on the holder rotating parts 430 move along the holder guide section 500. As the guide pin parts 433 are engaged with the left end (in FIG. 1) of the holder guide section 500, the guide pin parts 433 are rotated in the clockwise direction (in FIG. 1) about the end of the holder guide section 500.

Due to this fact, the holder shaft 410 coupled to the holder rotating parts 430 rotates, and the holder body 420 coupled to the holder shaft 410 rotates in the clockwise direction and deploys the combiner 50.

Referring to FIGS. 12 and 13, as the driving pin part 620 moves along the idle path 213 according to the rotation of the rotating section 600, the moving section 200 does not move any more, and the tilt section 300 disposed on the moving section 200 moves leftward (in FIG. 12).

Referring to FIG. 14, when the tilt section 300 moves leftward (in FIG. 14), the pressing parts 320 coupled to the tilt body 310 are brought into contact with the body projections 421. In this regard, because the lower ends of the pressing parts 320 are formed with the inclined surfaces which are upwardly inclined toward the body projections 421 (the left side in FIG. 14), as the pressing parts 320 move leftward, the body projections 421 move downward (in FIG. 14).

Due to this fact, the holder body 420 on which the body projections 421 are formed rotates in the clockwise direction, and the angle of the combiner 50 is adjusted, whereby resolving power is improved.

Referring to FIG. 14, the body projections 421 are movable in the body projection guide parts 435 which are formed in the holder rotating parts 430, and due to this fact, the angle of the combiner 50 may be adjusted with the position of the holder rotating parts 430 fixed, whereby it is possible to improve the resolving power.

The movement distance of the tilt section 300 may be adjusted by differently setting the shape of the second pin guide part 311, and due to this fact, it is possible to adjust the angle of the combiner 50.

Also, as the rotating section 600 is rotated by a predetermined angle, the tilt section 300 may be linearly moved through a predetermined distance, and due to this fact, it is possible to adjust the slope of the combiner 50.

Referring to FIG. 9, as the guide grooves 510 extend leftward (in FIG. 9), the guide grooves 510 are positioned lower than the moving section 200 which linearly moves at the same height.

Due to this fact, after the holder rotating parts 430 are rotated in the clockwise direction (in FIG. 9) and the combiner 50 is unfolded, when the moving section 200 moves again rightward, the holder rotating parts 430 are rotated in the counterclockwise direction (in FIG. 9) and the combiner 50 is folded and received in the housing section 100.

Referring to FIG. 11, according to the linear movement of the moving section 200, the projection part 214 which is formed to project from the moving body 210 is brought into contact with the opening/closing sensing section 800 and senses the opening/closing of the combiner 50.

In detail, when the moving body 210 moves leftward, the left side surface (in FIG. 11) of the projection part 214 is brought into contact with the unfolding sensing part 810 and senses the unfolding of the combiner 50. When the moving body 210 moves rightward, the right side surface (in FIG. 11) of the projection part 214 is brought into contact with the folding sensing part 820 and senses the folding of the combiner 50.

Referring to FIG. 14, the elastic members 440 are formed of an elastic material, and are disposed such that one ends of the elastic members 440 are brought into contact with the support projections 431 which are formed on the holder rotating parts 430 and the other ends of the elastic members 440 are brought into contact with the body projections 421 which are formed on the holder body 420.

Due to this fact, when the pressing parts 320 move leftward (in FIG. 14), the body projections 421 press the elastic members 440, and the elastic members 440 elastically support the body projections 421 in the counterclockwise direction (in FIG. 14). The elastic members 440 allow the combiner 50 to be quickly folded and received when the moving body 210 moves rightward (in FIG. 14).

In addition, the elastic members 440 press the body projections 421 in the counterclockwise direction (in FIG. 14) such that the inclination of the combiner 50 adjusted by the pressing parts 320 is retained at a set angle.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A head-up display device for a vehicle, comprising:
a housing section mounted to a vehicle;
a moving section reciprocating on the housing section;
a holder section coupled to a combiner and rotatably coupled to the moving section;
a rotating section rotating by receiving power from a driving section, connected with the moving section, and transferring power to the moving section; and
a tilt section connected to the moving section, and reciprocating on the moving section by rotation of the rotating section to adjust an angle of the combiner,
wherein the rotating section comprises:
a rotating body rotating about a driving shaft; and
a driving pin part fixedly coupled to the rotating body, and
wherein the moving section comprises:
a moving body slidably moving on the housing section, and formed with a first pin guide part through which the driving pin part passes.

2. The head-up display device according to claim 1, wherein the tilt section comprises:
a tilt body slidably moving on the moving section, and formed with a second pin guide part through which the driving pin part passes.

3. The head-up display device according to claim 1, wherein the first pin guide part comprises:
a first movement path providing a rotation path of the driving pin part to allow the moving body to move on the housing section; and
an idle path connected with the first movement path, and formed to have the same curvature as a curvature of a movement locus of the driving pin part.

4. The head-up display device according to claim 2, wherein the second pin guide part comprises:
a movement path providing a rotation path of the driving pin part to allow the tilt body to move on the housing section; and
a tilt path connected with the movement path, and formed to have a curvature smaller than the curvature of a movement locus of the driving pin part.

5. The head-up display device according to claim 2, wherein the holder section comprises:
a holder shaft rotatably coupled to the moving section;
a holder body coupled with the combiner, and coupled to and integrally rotating with the holder shaft; and
holder rotating parts coupled to the holder shaft, and rotatably disposed outside the holder body.

6. The head-up display device according to claim 5, further comprising:
a holder guide section fixedly coupled to the housing section, and formed with guide grooves which provide a movement path of the holder section,
wherein guide pin parts are formed to project outward from the holder rotating parts, and the guide pin parts move along the guide grooves.

7. The head-up display device according to claim 6, wherein the holder section further comprises:
elastic members formed of an elastic material, and having one ends which are brought into contact with support projections projectingly formed on the holder rotating parts and the other ends which elastically support body projections formed on the holder body.

8. The head-up display device according to claim 7, wherein the tilt section further comprises:
pressing parts coupled to the tilt body, and pressing the body projections, and
wherein lower ends of the pressing parts are formed with inclined surfaces which are upwardly inclined toward the body projections.

9. A head-up display device for a vehicle, comprising:
a housing section mounted to a vehicle,
a moving section reciprocating on the housing section,
a holder section coupled to a combiner and rotatably coupled to the moving section,
a rotating section rotating by receiving power from a driving section, connected with the moving section, and transferring power to the moving section,
a projection part formed to project outward from the moving section, and
an opening/closing sensing section coupled to the housing section, and sensing opening/closing of the combiner by being brought into contact with the projection part when the moving section moves.

10. The head-up display device according to claim 9, wherein the opening/closing sensing section comprises:
an unfolding sensing part coupled to one end of the housing section, and sensing unfolding of the combiner; and
a folding sensing part coupled to the other end of the housing section, and sensing folding of the combiner.

* * * * *